(12) United States Patent
Tabata et al.

(10) Patent No.: US 12,026,992 B2
(45) Date of Patent: Jul. 2, 2024

(54) VEHICLE CONTROL DEVICE

(71) Applicant: TOYOTA JIDOSHA KABUSHIKI KAISHA, Toyota (JP)

(72) Inventors: Atsushi Tabata, Okazaki (JP); Koichi Okuda, Toyota (JP); Tooru Matsubara, Toyota (JP); Hiromasa Tatsushiro, Toyota (JP); Kota Fujii, Nisshin (JP); Yuuki Makino, Aichi-gun (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 398 days.

(21) Appl. No.: 17/106,895

(22) Filed: Nov. 30, 2020

(65) Prior Publication Data

US 2021/0174614 A1    Jun. 10, 2021

(30) Foreign Application Priority Data

Dec. 6, 2019  (JP) .................................. 2019-221697

(51) Int. Cl.

| F16H 57/00 | (2012.01) |
| B60R 16/023 | (2006.01) |
| G06N 20/00 | (2019.01) |
| G07C 5/00 | (2006.01) |
| G07C 5/08 | (2006.01) |
| F16H 61/30 | (2006.01) |

(52) U.S. Cl.
CPC ........ *G07C 5/0808* (2013.01); *B60R 16/0234* (2013.01); *F16H 57/00* (2013.01); *G06N 20/00* (2019.01); *G07C 5/006* (2013.01); *F16H 61/30* (2013.01)

(58) Field of Classification Search
None
See application file for complete search history.

(56) References Cited

U.S. PATENT DOCUMENTS

| 6,055,475 A | * | 4/2000 | Moriyama | .............. F16H 61/08 |
| | | | | 701/56 |
| 6,374,170 B1 | * | 4/2002 | Kresse | ................ F16H 61/0437 |
| | | | | 477/154 |
| 6,546,321 B1 | | 4/2003 | Ohkubo | |

(Continued)

FOREIGN PATENT DOCUMENTS

| CN | 104176002 A | * | 12/2014 |
| CN | 106907211 A | * | 6/2017 |

(Continued)

*Primary Examiner* — Redhwan K Mawari
*Assistant Examiner* — Kai Nmn Wang
(74) *Attorney, Agent, or Firm* — Oliff PLC

(57) ABSTRACT

A vehicle control device performs learning to correct a parameter used in a control program for controlling a vehicle. The vehicle control device stores learning data obtained by the learning in a storage unit. The vehicle control device determines whether or not a part controlled by the parameter has been replaced, and resets the learning data stored in the storage unit when it is determined that the part has been replaced. The vehicle control device determines that the part has been replaced based on an adjustment that is performed upon replacement of the part. The vehicle control device quickly mitigates degradation of the controllability of the vehicle after replacement of the part.

6 Claims, 9 Drawing Sheets

(56) References Cited

U.S. PATENT DOCUMENTS

| | | | | |
|---|---|---|---|---|
| 9,056,613 B2 * | 6/2015 | Johri | .................... | B60W 10/08 |
| 9,484,851 B2 * | 11/2016 | Bang | .................. | B60L 50/16 |
| 9,533,677 B2 * | 1/2017 | Nefcy | .................. | B60W 20/30 |
| 10,046,755 B2 * | 8/2018 | Kato | .................. | B60W 50/082 |
| 10,106,148 B2 * | 10/2018 | Meyer | ................... | B60W 10/06 |
| 10,144,412 B2 * | 12/2018 | Kotsuji | .................... | B60L 7/26 |
| 10,166,994 B1 * | 1/2019 | Fields | .................... | G08B 25/10 |
| 10,246,097 B1 * | 4/2019 | Fields | .................. | G06Q 40/08 |
| 2002/0189114 A1 * | 12/2002 | Voeller | .................. | G01B 5/255 |
| | | | | 33/203.18 |
| 2009/0216399 A1 | 8/2009 | Ishikawa | | |
| 2016/0214599 A1 * | 7/2016 | Doering | ............... | B60W 20/40 |
| 2016/0304076 A1 * | 10/2016 | Nefcy | .................. | B60W 20/30 |
| 2021/0124950 A1 * | 4/2021 | Jones | ....................... | G06T 7/80 |

FOREIGN PATENT DOCUMENTS

| | | | | | |
|---|---|---|---|---|---|
| JP | 2001-065399 A | | 3/2001 | | |
| JP | 2001065399 A | * | 3/2001 | ......... | F02D 41/2425 |
| JP | 4038214 B2 | * | 1/2008 | ............ | B60K 6/445 |
| JP | 2008286251 A | * | 11/2008 | | |
| JP | 2009-035207 A | | 2/2009 | | |
| JP | 2009-198393 A | | 9/2009 | | |
| JP | 2012197046 A | * | 10/2012 | | |
| WO | WO-2019017337 A1 | * | 1/2019 | ............ | B60K 6/445 |

\* cited by examiner

| | | HYDRAULIC FRICTION-ENGAGING DEVICE | | | | | SOLENOID PATTERN | | | | | |
|---|---|---|---|---|---|---|---|---|---|---|---|---|
| | | C1 | C2 | B1 | B2 | F1 | SL1 | SL2 | SL3 | SL4 | SC1 | SC2 |
| P | | ○ | | | ○ | | ○ | | | ○ | ○ | ○ |
| Rev | | ○ | | | ○ | | ○ | | | ○ | ○ | ○ |
| N | | ○ | | | ○ | | ○ | | | ○ | ○ | |
| D | 1st | ○ | | | ○ | ○ | ○ | | | ○ | ○ | |
| | 2nd | ○ | | ○ | | | ○ | | ○ | | ○ | |
| | 3rd | ○ | ○ | | | | ○ | ○ | | | ○ | |
| | 4th | | ○ | ○ | | | | ○ | ○ | | ○ | |

FIG. 10
| THROTTLE VALVE OPENING DEGREE θth[%] | CORRECTION VALUE CMP [A] LEARNED BY ON-ROAD LEARNING |
|---|---|
| 0-25 | $\Delta Pc2\text{-}1$ |
| 25-50 | $\Delta Pc2\text{-}2$ |
| 50-75 | $\Delta Pc2\text{-}3$ |
| 75-100 | $\Delta Pc2\text{-}4$ |
FIG. 11A
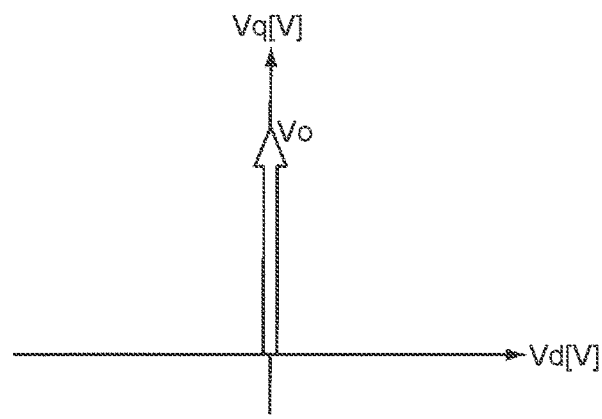
FIG. 11B
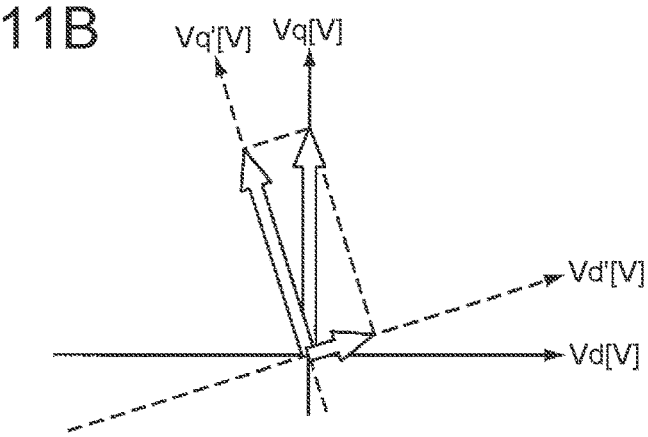

FIG. 12

| NAME OF VEHICLE | XXX-HV | | NAME OF DEALER | ABC |
| VEHICLE BODY NUMBER | *○◎*× | | NAME OF INSPECTION | FIFTH-YEAR PERIODIC INSPECTION |

VEHICLE'S HISTORY
  MARCH 5, 2019: PURCHASED
  MARCH 1, 2024: AT REPLACED

VEHICLE CONTROL DEVICE

CROSS-REFERENCE TO RELATED APPLICATION

This application claims priority to Japanese Patent Application No. 2019-221697 filed on Dec. 6, 2019, incorporated herein by reference in its entirety.

BACKGROUND

1. Technical Field

The present disclosure relates to a vehicle control device that performs learning of correcting a parameter used in a control program for controlling a vehicle.

2. Description of Related Art

There are known vehicle control devices that are configured to update a learned value stored in a storage unit and store the updated learned value, and that store an initial set value of the learned value in advance and, when part replacement information is input, rewrite the learned value relating to the replaced part to the initial set value. One example is the control device described in Japanese Patent Application Publication No. 2001-65399 (JP 2001-65399 A).

SUMMARY

In the vehicle control device described in JP 2001-65399 A, part replacement information is input manually. Therefore, if part replacement information fails to be input, the learned value relating to the replaced part will not be rewritten to the initial value, which may degrade the controllability of the vehicle after replacement of the part.

The present disclosure has been contrived under these circumstances, and an object thereof is to provide a vehicle control device that automatically determines that a part has been replaced and appropriately executes learning upon replacement of the part to quickly mitigate degradation of the controllability of the vehicle after replacement of the part.

The gist of a first disclosure is as follows: A vehicle control device that performs learning to correct a parameter used in a control program for controlling a vehicle, the vehicle control device including (a) a storage unit that stores learning data obtained by the learning, (b) a replacement determining unit that determines whether or not a part controlled by the parameter has been replaced, and (c) a rewriting executing unit that resets the learning data stored in the storage unit when the replacement determining unit determines that the part has been replaced, wherein the replacement determining unit determines that the part has been replaced based on an adjustment that is performed upon replacement of the part.

The gist of a second disclosure is as follows: The vehicle control device of the first disclosure, wherein the adjustment is an adjustment of a resolver provided in a rotating machine that transmits a travel driving force to the part.

The gist of a third disclosure is as follows: The vehicle control device of the first or second disclosure, wherein the replacement determining unit determines that the part has been replaced based on an update, resulting from the adjustment, in a replacement record of the part included in maintenance information.

The gist of a fourth disclosure is as follows: The vehicle control device of the third disclosure, wherein, after the replacement record is updated, the replacement determining unit determines only once that the part has been replaced.

The gist of a fifth disclosure is as follows: The vehicle control device of any one of the first to fourth disclosures, wherein (a) the part is a transmission, and (b) the parameter is an oil pressure command value for controlling switching of a gear stage of the transmission.

The gist of a sixth disclosure is as follows: The vehicle control device of any one of the first to fifth disclosures, further including an IG determining unit that determines whether or not an ignition signal has been switched from an OFF signal that stops a travel driving force source to an ON signal that starts the travel driving force source, wherein the replacement determining unit determines whether or not the part has been replaced when the IG determining unit determines that the ignition signal has been switched from the OFF signal to the ON signal.

The vehicle control device of the first disclosure includes (a) the storage unit that stores the learning data obtained by the learning, (b) the replacement determining unit that determines whether or not the part controlled by the parameter has been replaced, and (c) the rewriting executing unit that resets the learning data stored in the storage unit when the replacement determining unit determines that the part has been replaced. The replacement determining unit determines that the part has been replaced based on the adjustment that is performed upon replacement of the part. Thus, the determination as to replacement of the part is automatically made based on the adjustment that is performed upon replacement of the part. Since the determination as to replacement of the part is automatically made and the learning data is reset, learning is appropriately executed upon replacement of the part, so that degradation of the controllability of the vehicle after replacement of the part is quickly mitigated.

The vehicle control device of the second disclosure is the vehicle control device of the first disclosure, wherein the adjustment is an adjustment of the resolver provided in the rotating machine that transmits a travel driving force to the part. It is possible to infer that the rotating machine has been re-mounted and, by extension, to automatically determine that the part has been replaced, based on the adjustment of the resolver.

The vehicle control device of the third disclosure is the vehicle control device of the first or second disclosure, wherein the replacement determining unit determines that the part has been replaced based on an update, resulting from the adjustment, in the replacement record of the part included in maintenance information. Since the determination as to replacement of the part is automatically made based on an update in the replacement record and the learning data is reset, degradation of the controllability of the vehicle after replacement of the part is quickly mitigated.

The vehicle control device of the fourth disclosure is the vehicle control device of the third disclosure, wherein, after the replacement record is updated, the replacement determining unit determines only once that the part has been replaced. Since the part is determined to have been replaced only once after the replacement record of the part included in the maintenance information is updated, the learning data is reset only once upon replacement of the part and thus execution of unnecessary learning is avoided.

The vehicle control device of the fifth disclosure is the vehicle control device of any one of the first to fourth disclosures, wherein (a) the part is a transmission, and (b)

the parameter is the oil pressure command value for controlling switching of the gear stage of the transmission. Thus, when it is determined that the transmission has been replaced, the learning data relating to the oil pressure command value stored in the learning data storage unit is reset. Therefore, learning is appropriately executed upon replacement of the transmission, so that aggravation of shift shock that occurs when the gear stage is switched after replacement of the transmission is quickly mitigated.

The vehicle control device of the sixth disclosure is the vehicle control device of any one of the first to fifth disclosures, further including the IG determining unit that determines whether or not the ignition signal has been switched from the OFF signal that stops the travel driving force source to the ON signal that starts the travel driving force source, wherein the replacement determining unit determines whether or not the part has been replaced when the IG determining unit determines that the ignition signal has been switched from the OFF signal to the ON signal. Since the learning data is reset when the ignition signal is switched from the OFF signal to the ON signal, a sense of discomfort that the driver feels can be reduced compared with when the learning data is reset while the vehicle is traveling.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 10 is an example about a correction value for an oil pressure command value that has been learned with a throttle valve opening degree divided into predetermined ranges in the case of gear shifting of the stepped transmission section from the second-speed gear stage to the third-speed gear stage;

FIG. 11A is a graph of a relationship between an exciting voltage and a torque voltage that are detected while a first rotating machine is rotating with zero output torque, and is a graph in a case where the resolver does not have an offset;

FIG. 11B is a graphs of a relationship between an exciting voltage and a torque voltage that are detected while a first rotating machine is rotating with zero output torque, and is a graph in a case where the resolver has an offset;

FIG. 12 is an example of maintenance information that has been updated after replacement of the compound transmission.

DETAILED DESCRIPTION OF EMBODIMENTS

An embodiment of the present disclosure will be described in detail below with reference to the drawings. In the following embodiment, the drawings are simplified or modified as necessary and do not necessarily exactly represent the dimensional ratios, shapes, etc. of parts.

Figure 1:
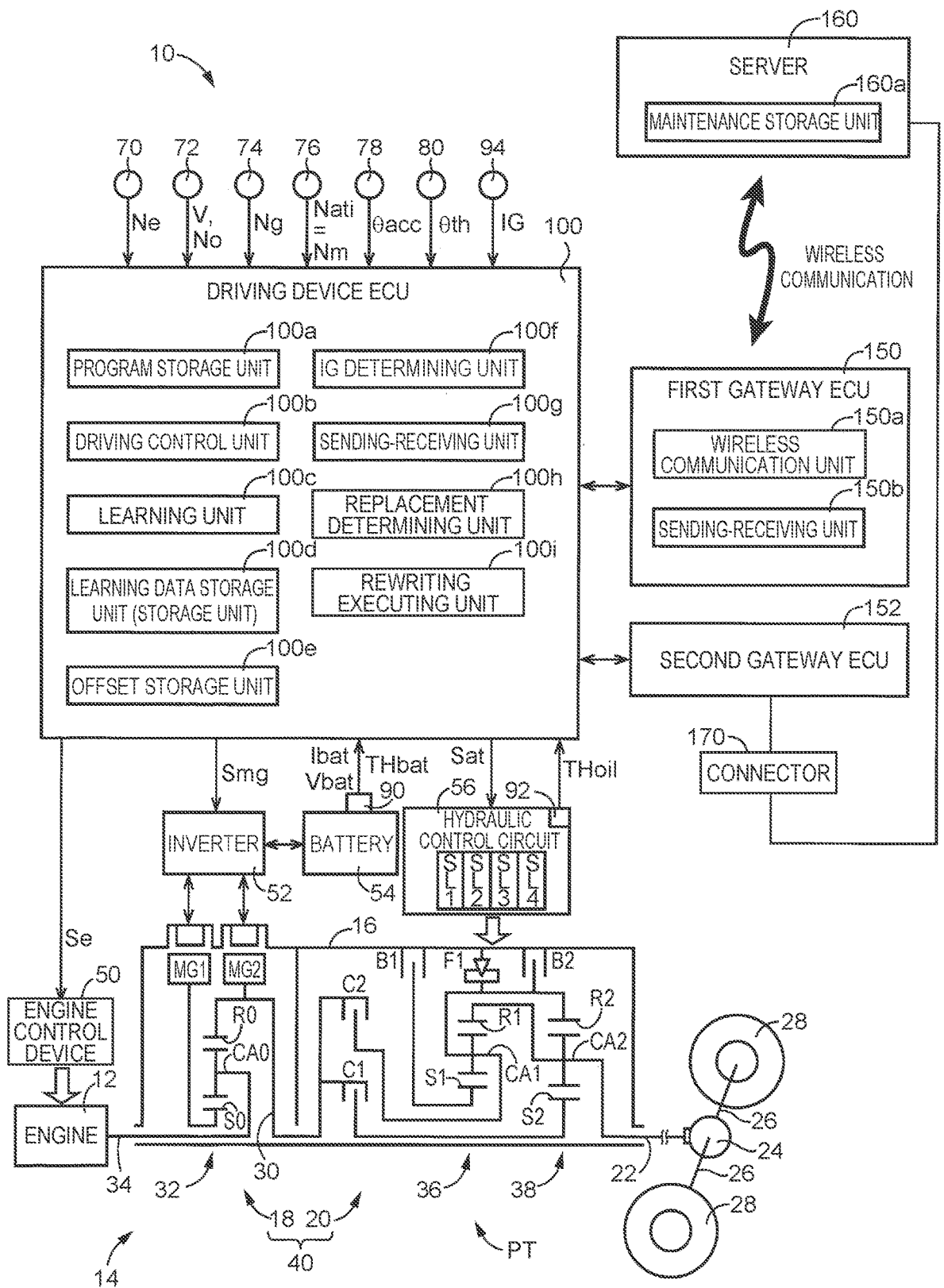
FIG. 1 is a schematic configuration diagram of a vehicle equipped with a driving device ECU according to an embodiment of the present disclosure, and is a functional block diagram showing a main part of control functions for various types of control in the vehicle.

FIG. 1 is a schematic configuration diagram of a vehicle 10 equipped with a driving device ECU 100 according to the embodiment of the present disclosure, and is a functional block diagram showing a main part of control functions for various types of control in the vehicle 10.

The vehicle 10 is a hybrid vehicle and includes an engine 12, a first rotating machine MG1, a second rotating machine MG2, a power transmission device 14, driving wheels 28, the driving device ECU 100, a first gateway ECU 150, and a second gateway ECU 152.

The engine 12 is a travel driving force source of the vehicle 10 and formed by an internal combustion engine, such as a gasoline engine or a diesel engine. An engine torque Te [Nm] output from the engine 12 is controlled as an engine control device 50 including an electronic throttle valve, fuel injection equipment, and an ignition system is controlled by the driving device ECU 100 to be described later.

The first rotating machine MG1 and the second rotating machine MG2 are, for example, rotating electrical machines that are so-called motor-generators having the functions of an electric motor (motor) and a power generator (generator). The first rotating machine MG1 and the second rotating machine MG2 can serve as travel driving force sources of the vehicle 10. Each of the first rotating machine MG1 and the second rotating machine MG2 is connected to a battery 54 provided in the vehicle 10 through an inverter 52 provided in the vehicle 10. As the inverter 52 is controlled by the driving device ECU 100 to be described later, an MG1 torque Tg [Nm] output from the first rotating machine MG1 and an MG2 torque Tm [Nm] output from the second rotating machine MG2 are controlled. As to torques output from the rotating machines, for example, in the case of positive rotation, a positive torque that is on an acceleration side is a power running torque and a negative torque that is on a deceleration side is a regenerative torque. When the MG1 torque Tg and the MG2 torque Tm output from the first rotating machine MG1 and the second rotating machine MG2, respectively, are power running torques, power output from the first rotating machine MG1 and the second rotating machine MG2 is a travel driving force. ("Driving force" and "torque" are used synonymously with "power" when no particular distinction is made among these words.) The battery 54 gives and receives electricity to and from each of the first rotating machine MG1 and the second rotating machine MG2. The battery 54 is a chargeable-dischargeable secondary battery, such as a lithium-ion battery pack or a nickel-metal hydride battery pack. The first rotating machine MG1 and the second rotating machine MG2 are provided inside a transaxle case 16 that is a non-rotating member mounted on a vehicle body. The engine 12, the first rotating machine MG1, and the second rotating machine MG2 correspond to the "travel driving force source" in the present disclosure, and the first rotating machine MG1 and the second rotating machine MG2 correspond to the "rotating machine" in the present disclosure.

The power transmission device 14 includes an electrical stepless transmission section 18, a mechanical stepped transmission section 20, and others that are disposed in series on a common central axis inside the transaxle case 16. The stepless transmission section 18 is coupled to the engine 12 directly or indirectly through a damper or the like (not shown). The stepped transmission section 20 is coupled to an output side of the stepless transmission section 18. The power transmission device 14 includes a differential gear 24 coupled to an output shaft 22 that is an output rotating member of the stepped transmission section 20, and a pair of axles 26 coupled to the differential gear 24. In the power transmission device 14, power output from the engine 12 and the second rotating machine MG2 is transmitted to the stepped transmission section 20. The power transmitted to the stepped transmission section 20 is transmitted to the driving wheels 28 through the differential gear 24 etc. The power transmission device 14 thus configured is suitably used for front-engine, rear-wheel-drive (FR) vehicles. The stepless transmission section 18, the stepped transmission section 20, etc. are configured so as to be substantially symmetrical with respect to the common central axis, and lower halves of these sections from the central axis are omitted from FIG. 1. This common central axis is a central axis of a crankshaft of the engine 12, a coupling shaft 34 coupled to the crankshaft, or the like. The stepless transmission section 18, the stepped transmission section 20, the differential gear 24, and the pair of axles 26 in the power transmission device 14 constitute a power transmission path PT provided between the engine 12 and the driving wheels 28.

The stepless transmission section 18 includes a differential mechanism 32 as a power split device that mechanically divides power from the engine 12 toward the first rotating machine MG1 and an intermediate transmission member 30 that is an output rotating member of the stepless transmission section 18. The first rotating machine MG1 is a rotating machine to which power from the engine 12 is transmitted. The second rotating machine MG2 is connected to the intermediate transmission member 30 so as to be able to transmit power thereto. The intermediate transmission member 30 is coupled to the driving wheels 28 through the stepped transmission section 20, and therefore the second rotating machine MG2 is a rotating machine that is connected to the power transmission path PT, as well as to the driving wheels 28, so as to be able to transmit power thereto.

The differential mechanism 32 is a commonly known single-pinion planetary gear device including a sun gear S0, a carrier CA0, and a ring gear R0.

The stepped transmission section 20 is a mechanical transmission mechanism as a stepped transmission that constitutes a part of the power transmission path PT between the intermediate transmission member 30 and the driving wheels 28, i.e., an automatic transmission that constitutes a part of the power transmission path PT between the differential mechanism 32 and the driving wheels 28. The intermediate transmission member 30 functions also as an input rotating member of the stepped transmission section 20. The stepped transmission section 20 is a commonly known planetary-gear automatic transmission including, for example, a plurality of planetary gear devices, namely a first planetary gear device 36 and a second planetary gear device 38, and a plurality of engaging devices, namely a clutch C1, a clutch C2, a brake B1, a brake B2, and a one-way clutch F1. Hereinafter, the clutch C1, the clutch C2, the brake B1, and the brake B2 will be referred to simply as hydraulic friction-engaging devices CB when no particular distinction is made among them.

The hydraulic friction-engaging device CB is a hydraulically operated friction-engaging device formed by, for example, a multi-disc or single-disc clutch or a brake that is pressed by a hydraulic actuator, or a band brake that is tightened by a hydraulic actuator. As a hydraulic control circuit 56 provided in the vehicle 10 is controlled by the driving device ECU 100 to be described later, the application state of each hydraulic friction-engaging device CB that is an engaged state, a released state, etc. is switched according to a regulated oil pressure output from the hydraulic control circuit 56.

The first planetary gear device 36 is a commonly known single-pinion planetary gear device including a sun gear S1, a carrier CA1, and a ring gear R1. The second planetary gear device 38 is a commonly known single-pinion planetary gear device including a sun gear S2, a carrier CA2, and a ring gear R2.

The differential mechanism 32, the first planetary gear device 36, the second planetary gear device 38, the hydraulic friction-engaging devices CB, the one-way clutch F1, the first rotating machine MG1, and the second rotating machine MG2 are coupled to one another as shown in FIG. 1.

An engagement torque that is the torque capacity of each hydraulic friction-engaging device CB is changed by a regulated engaging oil pressure that is output from each of linear solenoid valves SL1 to SL4 etc. in the hydraulic control circuit 56 provided in the vehicle 10.

In the stepped transmission section 20, one of gear stages that are different from one another in gear ratio γat (=AT input rotation speed Nati [rpm]/AT output rotation speed Nato [rpm]) is established as the combination of the application states of more than one hydraulic friction-engaging device CB is switched. The AT input rotation speed Nati is an input rotation speed of the stepped transmission section 20 and has the same value as the rotation speed of the intermediate transmission member 30 and an MG2 rotation speed Nm [rpm]. The AT output rotation speed Nato is the rotation speed of the output shaft 22 that is an output rotating member of the stepped transmission section 20, and is also an output rotation speed No [rpm] of a compound transmission 40 that is the entire transmission combining the stepless transmission section 18 and the stepped transmission section 20. The compound transmission 40 corresponds to the "transmission" and the "part" in the present disclosure.

In a completed state of the vehicle 10 (including, for example, a state where conversion or repair, i.e., replacement or repair, of the compound transmission 40 has been completed), the first rotating machine MG1 and the second rotating machine MG2 can be said to be integrally configured with the compound transmission 40. The first rotating machine MG1 and the second rotating machine MG2 are configured to be able to transmit to the compound transmission 40 a travel driving force that each of them outputs.

Figure 2:
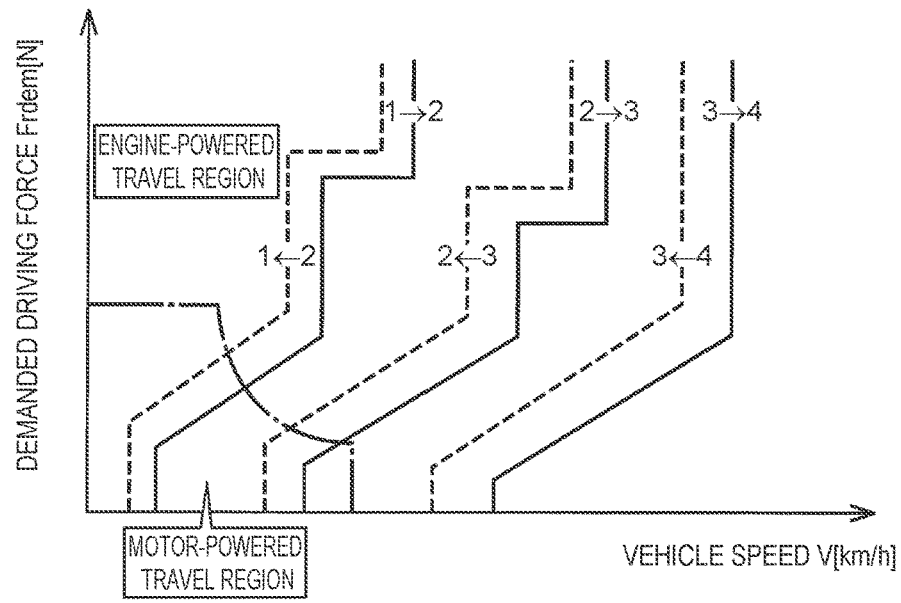
FIG. 2 is a graph showing one example of, and a relationship between, a gear shifting chart that is used for gear shifting control of a stepped transmission section and a power source switching map that is used for controlling switching between engine-powered travel and motor-powered travel.

FIG. 2 is a graph showing one example of, and a relationship between, a gear shifting chart that is used for gear shifting control of the stepped transmission section 20 and a power source switching map that is used for controlling switching between engine-powered travel and motor-powered travel. Engine-powered travel is a travel mode in which at least the engine 12 is used as a travel driving force source. Motor-powered travel is a travel mode in which the engine 12 is not used as a travel driving force source and the first rotating machine MG1 or the second rotating machine MG2 is used as a travel driving force source. As shown in FIG. 2, relationships (a gear shifting chart or a gear shifting map) represented by upshift lines (solid lines) and downshift lines (dashed lines), with a vehicle speed V [km/h] and a demanded driving force Frdem [N] as variables, are stored in advance. When a point specified by the actual vehicle speed V and demanded driving force Frdem that are variables crosses an upshift line (solid line) or a downshift line (dashed line), it is determined to start gear shifting control. Motor-powered travel is executed in a region indicated by the long dashed short dashed line where the engine efficiency is generally low, which is a low-vehicle-speed region where the vehicle speed V is relatively low or a low-load region where the demanded driving force Frdem is relatively low. Further, motor-powered travel is used when the state-of-charge (charge capacity) SOC [%] of the battery 54 connected to the second rotating machine MG2 through the inverter 52 is not lower than a predetermined value. Establishing a gear stage of the stepped transmission section 20 based on this gear shifting chart can achieve favorable fuel efficiency of the vehicle 10.

Figure 3:
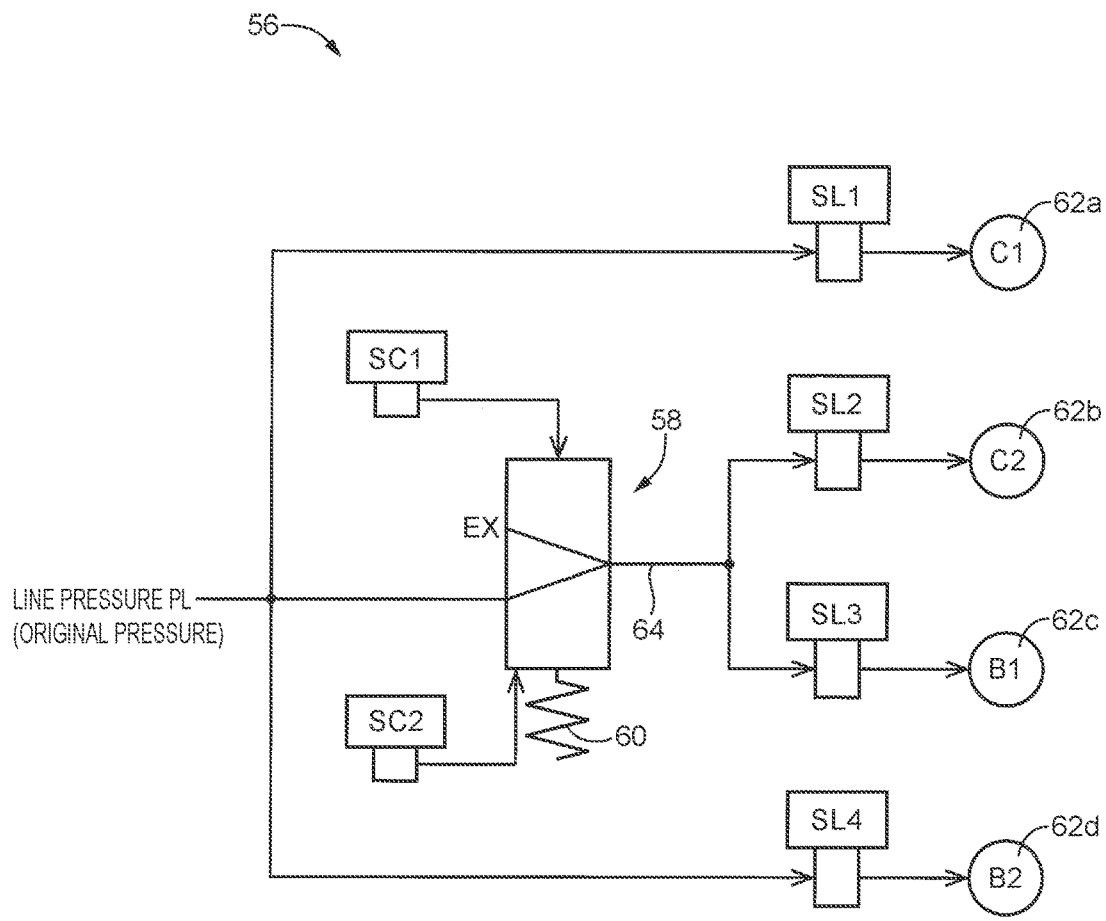
FIG. 3 is a hydraulic circuit diagram illustrating part of the configuration of a hydraulic control circuit that performs gear shifting control of the stepped transmission section.

FIG. 3 is a hydraulic circuit diagram illustrating part of the configuration of the hydraulic control circuit 56 that performs gear shifting control of the stepped transmission section 20.

The hydraulic control circuit 56 includes, as components for controlling the engagement torques of the hydraulic friction-engaging devices CB that are engaging elements provided in the stepped transmission section 20, the linear solenoid valve SL1, the linear solenoid valve SL2, the linear solenoid valve SL3, the linear solenoid valve SL4 (hereinafter referred to simply as "linear solenoid valves SL" when no particular distinction is made among them), a solenoid valve SC1, a solenoid valve SC2 (hereinafter referred to simply as "solenoid valves SC" when no particular distinction is made between them), and a switching valve 58.

The linear solenoid valve SL is an electromagnetic valve that, using a line pressure PL [Pa] regulated by, for example, a regulator valve (not shown) as an original pressure, outputs an oil pressure corresponding to an oil pressure control command signal Sat that is input from the driving device ECU 100 (see FIG. 1), according to an electromagnetic force of a solenoid that is controlled based on the oil pressure control command signal Sat.

An oil pressure output from the linear solenoid valve SL1 is supplied to a hydraulic actuator 62*a* that controls the application state of the clutch C1. An oil pressure output from the linear solenoid valve SL2 is supplied to a hydraulic actuator 62*b* that controls the application state of the clutch C2. An oil pressure output from the linear solenoid valve SL3 is supplied to a hydraulic actuator 62*c* that controls the application state of the brake B1. An oil pressure output from the linear solenoid valve SL4 is supplied to a hydraulic actuator 62*d* that controls the application state of the brake B2.

Based on the oil pressure control command signal Sat input from the driving device ECU 100, each solenoid valve SC switches between an ON state where the switching valve 58 outputs an oil pressure and an OFF state where the switching valve 58 does not output an oil pressure. The solenoid valves SC are preferably normally closed ON-OFF valves.

A state where an oil pressure is supplied from the solenoid valve SC1 and the solenoid valve SC2 will be referred to as an ON-state, and a state where no oil pressure is supplied from the solenoid valve SC1 and the solenoid valve SC2 will be referred to as an OFF state. The switching valve 58 is provided with a spring 60 that urges a spool valve element in the switching valve 58. When the solenoid valve SC1 is in the OFF state and the solenoid valve SC2 is in the OFF state, the switching valve 58 is kept in the OFF state as the spool valve element in the switching valve 58 is urged by an urging force of the spring 60. When the solenoid valve SC1 is in the ON state and the solenoid valve SC2 is in the OFF state, the switching valve 58 is kept in the ON state as the spool valve element in the switching valve 58 is moved against the urging force of the spring 60. When the solenoid valve SC1 is in the ON state and the solenoid valve SC2 is in the ON state, the switching valve 58 is kept in the OFF state as the spool valve element in the switching valve 58 is urged by the urging force of the spring 60.

Thus, in the hydraulic control circuit 56 shown in FIG. 3, when the solenoid valve SC1 is in the ON state and the solenoid valve SC2 is in the OFF state, a supply source of the line pressure PL and an oil passage 64 between the linear solenoid valve SL2 and the linear solenoid valve SL3 communicate with each other. When both the solenoid valve SC1 and the solenoid valve SC2 are in the OFF state, or when both the solenoid valve SC1 and the solenoid valve SC2 are in the ON state, communication between the supply source of the line pressure PL (original pressure) and the oil passage 64 is interrupted while a drain port EX in the switching valve 58 and the oil passage 64 communicate with each other.

Figures 4, 5:
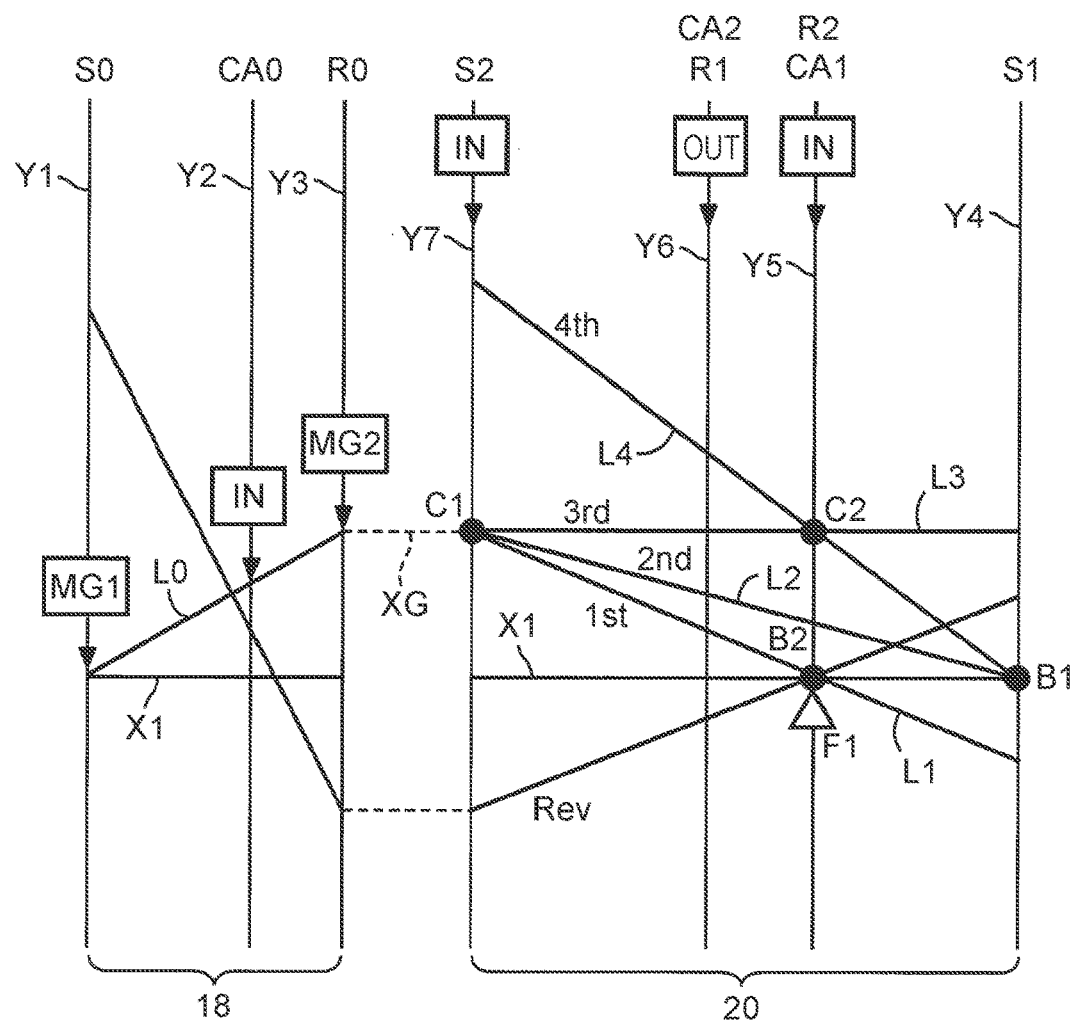
FIG. 4 is an actuation table showing, alongside each other, combinations of hydraulic friction-engaging devices to be actuated that are used to establish the respective gear stages in the stepped transmission section and combinations of solenoid patterns in the respective gear stages.
FIG. 5 is a nomogram in which relationships among the rotation speeds of rotating elements in a power transmission device that are coupled to one another in a different state in a different gear stage can be represented by straight lines.

FIG. 4 is an actuation table showing, alongside each other, combinations of the hydraulic friction-engaging devices CB to be actuated (combinations of the application states thereof) that are used to establish the respective gear stages in the stepped transmission section 20 and combinations of solenoid patterns in the respective gear stages. For the hydraulic friction-engaging devices shown in FIG. 4, circles represent an engaged state and blank cells represent a released state. For the solenoid patterns shown in FIG. 4, circles represent a state where an oil pressure is output and blank cells represent a state where no oil pressure is output.

In FIG. 4, "P," "Rev," "N," and "D" represent a parking range, a reverse range, a neutral range, and a drive range, respectively, one of which is selected by manual operation of a shift lever. The parking range and the neutral range are no-travel ranges that are selected not to cause the vehicle 10 to travel. The reverse range is a travel range that is selected to cause the vehicle 10 to travel backward. The drive range is a travel range that is selected to cause the vehicle 10 to travel forward. As the linear solenoid valves SL and the solenoid valves SC are controlled in accordance with the solenoid patterns shown in FIG. 4, the combination of the application states of the hydraulic friction-engaging devices CB is controlled. The range of the power transmission device 14 is switched and the gear stage established in the stepped transmission section 20 is switched, i.e., gears are shifted, according to the combination of the application states of the hydraulic friction-engaging devices CB.

FIG. 5 is a nomogram in which relationships among the rotation speeds of rotating elements in the power transmission device 14 that are coupled to one another in a different state in a different gear stage can be represented by straight lines. The nomogram shown in FIG. 5 is represented by two-dimensional coordinates, with the axis of abscissas showing relationships among gear ratios ρ of the differential mechanism 32, the first planetary gear device 36, and the second planetary gear device 38 and the axis of ordinates showing relative rotation speeds. The horizontal line X1 indicates zero rotation speed, and the horizontal line XG indicates the rotation speed of the intermediate transmission member 30.

The three vertical lines Y1, Y2, Y3 indicate, from the left side, the relative rotation speeds of the sun gear S0, the carrier CA0, and the ring gear R0, respectively, and the intervals of the three vertical lines Y1 to Y3 are determined according to the gear ratio of the differential mechanism 32. The four vertical lines Y4, Y5, Y6, Y7 indicate, from the right side, the relative rotation speeds of the sun gear 51, the carrier CA1 and the ring gear R2, the ring gear R1 and the carrier CA2, and the sun gear S2, respectively, and the intervals of the four vertical lines Y4 to Y7 are determined according to the gear ratios of the first planetary gear device 36 and the second planetary gear device 38.

As shown in FIG. 5, in the stepped transmission section 20, when the clutch C1 and the brake B2 (one-way clutch F1) are engaged, the rotation speed of the output shaft 22 in a first-speed gear stage (1st) is indicated by the point of intersection between the oblique straight line L1 that passes through the point of intersection between the vertical line Y7 and the horizontal line XG and the point of intersection between the vertical line Y5 and the horizontal line X1, and the vertical line Y6 that indicates the rotation speed of a rotating element coupled to the output shaft 22. The rotation speed of the output shaft 22 in a second-speed gear stage (2nd) is indicated by a point determined when the clutch C1 and the brake B1 are engaged, which is the point of intersection between the oblique straight line L2 and the vertical line Y6 indicating the rotation speed of the rotating element coupled to the output shaft 22. The rotation speed of the output shaft 22 in a third-speed gear stage (3rd) is indicated by a point determined when the clutch C1 and the clutch C2 are engaged, which is the point of intersection between the horizontal straight line L3 and the vertical line Y6 indicating the rotation speed of the rotating element coupled to the output shaft 22. The rotation speed of the output shaft 22 in a fourth-speed gear stage (4th) is indicated by a point determined when the clutch C2 and the brake B1 are engaged, which is the point of intersection between the oblique straight line L4 and the vertical line Y6 indicating the rotation speed of the rotating element coupled to the output shaft 22.

As described above, the gear stage established in the stepped transmission section 20 is switched as the combination of the hydraulic friction-engaging devices CB to be engaged is changed.

As shown in FIG. 1, the vehicle 10 includes the driving device ECU 100. The driving device ECU 100 includes a so-called microcomputer having, for example, a CPU, RAM, ROM, input-output interface, and others. The CPU controls driving devices of the vehicle 10 including the engine 12, the first rotating machine MG1, the second rotating machine MG2, and the power transmission device 14 by performing signal processing in accordance with a program that is stored in the ROM in advance using a temporary storage function of the RAM. The driving device ECU 100 corresponds to the "control device" in the present disclosure.

Input into the driving device ECU 100 are various signals etc. (e.g., the engine speed Ne [rpm]; the output rotation speed No that is the rotation speed of the output shaft 22; an MG1 rotation speed Ng [rpm] that is the rotation speed of the first rotating machine MG1; the MG2 rotation speed Nm [rpm] that is the rotation speed of the second rotating machine MG2; an accelerator operation amount θacc [%] that is an operation amount of an accelerator pedal representing the extent of acceleration operation by a driver; a throttle valve opening degree θth [%]; a battery temperature THbat [° C.], a battery charge-discharge current that [A], and a battery voltage Vbat [V] of the battery 54; a hydraulic fluid temperature THoil [° C.] inside the hydraulic control circuit 56; and the ignition signal IG that is a signal indicating whether to start or stop the travel driving force source) based on detection values of various sensors etc. (e.g., rotation speed sensors 70, 72, resolvers 74, 76, an accelerator operation amount sensor 78, a throttle valve opening degree sensor 80, a battery sensor 90, an oil temperature sensor 92, and an ignition switch 94 that is a switch for starting the travel driving force source) provided in the vehicle 10.

From the driving device ECU 100, various command signals (e.g., an engine control command signal Se that is a command signal for controlling the engine 12, a rotating machine control command signal Smg that is a command signal for controlling each of the first rotating machine MG1 and the second rotating machine MG2, and the oil pressure control command signal Sat that is a command signal for controlling the application state of each hydraulic friction-engaging device CB) are output to the devices (e.g., the engine control device 50, the inverter 52, and the hydraulic control circuit 56) provided in the vehicle 10.

The driving device ECU 100 functionally includes a program storage unit 100a, a driving control unit 100b, a learning unit 100c, a learning data storage unit 100d, and an offset storage unit 100e.

The program storage unit 100a stores control programs for controlling the driving devices.

The driving control unit 100b executes operation control of the engine 12, the first rotating machine MG1, and the second rotating machine MG2, and executes gear shifting control of switching the gear stage of the stepped transmission section 20 of the power transmission device 14, in accordance with the control programs stored in the program storage unit 100a.

The learning unit 100c learns a correction value for correcting the value of a parameter used in a control program. The learned correction value is stored in the learning data storage unit 100d. The learning data storage unit 100d is formed by, for example, a non-volatile memory. In the driving control unit 100b, the value of the parameter that is the object of learning is corrected by the learned correction value, and a corrected learned value LRN is used in the control program as the parameter. The learning data storage unit 100d corresponds to the "storage unit" in the present disclosure.

In the following, learning of a driving current IDR [A] for the linear solenoid valve SL that controls switching of the gear stage of the stepped transmission section 20 will be described as a specific example of learning of a parameter used in a control program.

Figure 6:
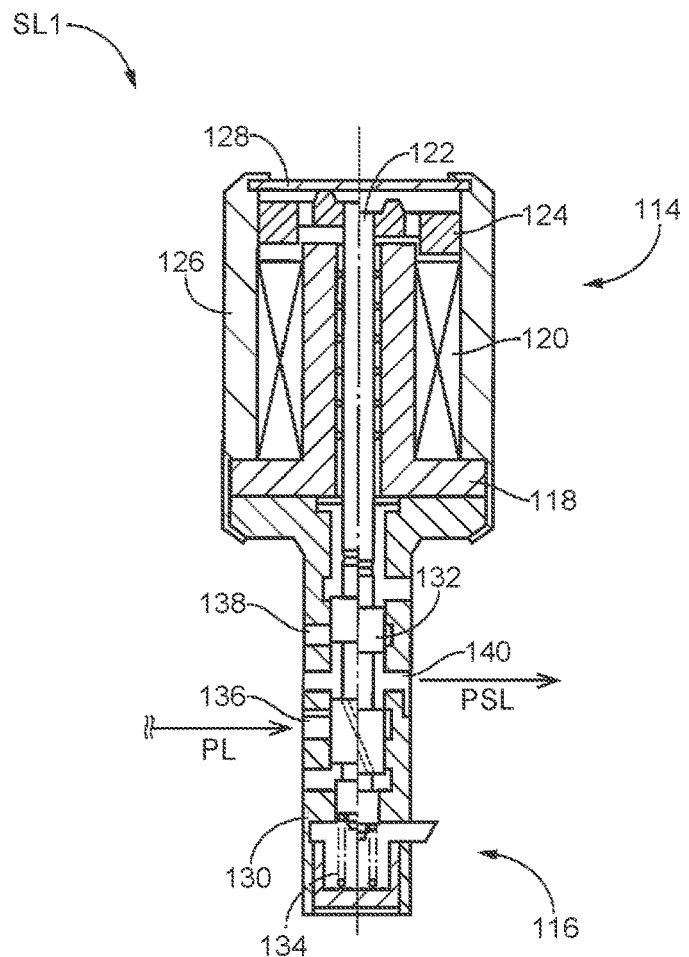
FIG. 6 is a sectional view illustrating the configuration of a linear solenoid valve provided in the hydraulic control circuit.

FIG. 6 is a sectional view illustrating the configuration of the linear solenoid valve SL provided in the hydraulic control circuit 56. The linear solenoid valves SL1 to SL4 provided in the hydraulic control circuit 56 have basically the same configuration; in FIG. 6, therefore, the linear solenoid valve SL1 is illustrated as a representative. The linear solenoid valve SL1 is composed of a solenoid 114 that is a device to which a current is applied and which then converts electric energy into a driving force, and a pressure regulating part 116 that is driven by the solenoid 114 to regulate the line pressure PL that is an input pressure and thereby generate a predetermined output pressure PSL [Pa].

The solenoid 114 includes a winding core 118, a solenoid coil 120, a core 122, a plunger 124, a case 126, and a cover 128. The winding core 118 has a cylindrical shape. The solenoid coil 120 is lead wire wound on an outer circumference of the winding core 118. The core 122 can move inside the winding core 118 in the direction of a central axis. The plunger 124 is fixedly provided at an end portion of the core 122 on the opposite side from the pressure regulating part 116. The case 126 houses the winding core 118, the solenoid coil 120, the core 122, and the plunger 124. The cover 128 is fitted in an opening of the case 126.

The pressure regulating part 116 has a sleeve 130, a spool valve element 132, and a spring 134. The sleeve 130 is fitted in the case 126. The spool valve element 132 is provided so as to be able to move inside the sleeve 130 in the direction of a central axis. The spring 134 urges the spool valve element 132 toward the solenoid 114. An end portion of the spool valve element 132 on the side of the solenoid 114 butts against an end portion of the core 122 on the side of the pressure regulating part 116.

In the linear solenoid valve SL1 thus configured, when a driving current IDR is applied to the solenoid coil 120, the plunger 124 is moved according to the current value in the direction of a central axis that is common to the core 122 and the spool valve element 132. As the plunger 124 is moved, the core 122 and also the spool valve element 132 are moved in the same direction. Thus, the flow rate of a hydraulic fluid input through an input port 136 and the flow rate of a hydraulic fluid discharged through a drain port 138 are adjusted. For example, based on the valve characteristics representing a relationship between the driving current IDR and the output pressure PSL shown in FIG. 7, the line pressure PL (original pressure) input through the input port 136 is regulated to a predetermined output pressure PSL corresponding to the driving current IDR and output through an output port 140.

Figure 7:
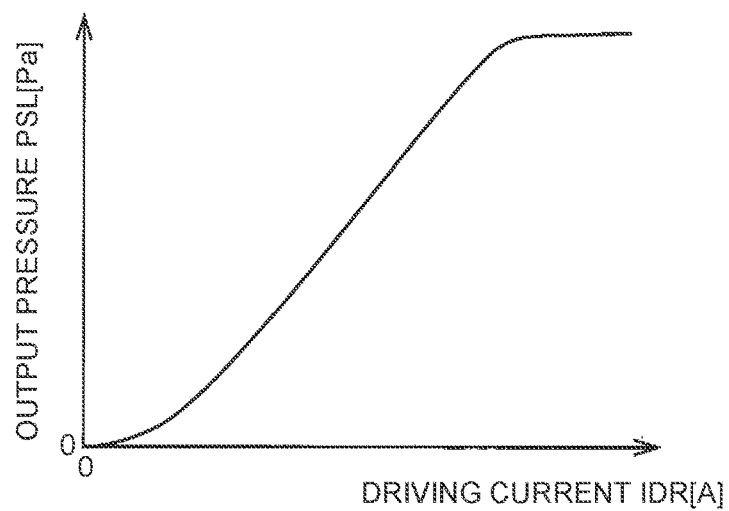
FIG. 7 is a graph showing an example of valve characteristics that represent a relationship between a driving current and an output pressure in the linear solenoid valve.
Figure 8:
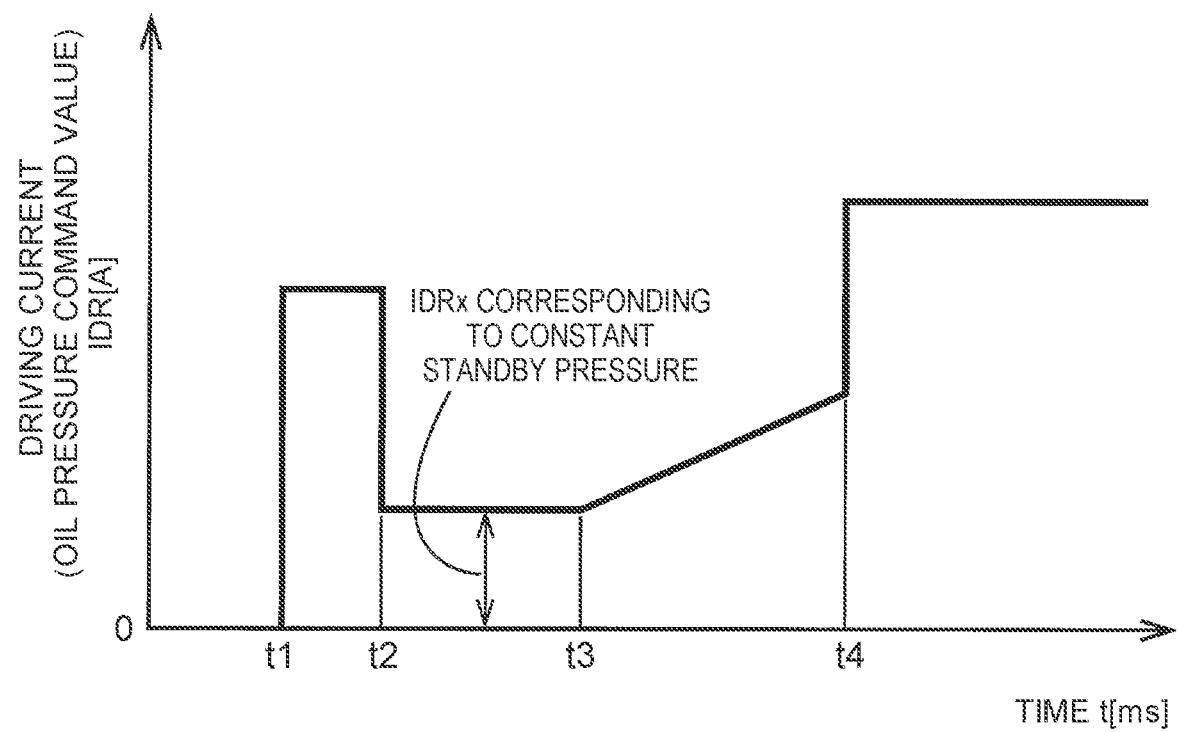
FIG. 8 is a time chart showing an example of an action of the linear solenoid valve during gear shifting of the stepped transmission section, and illustrating how a driving current to the linear solenoid valve changes during a transitional period of engagement of a predetermined hydraulic friction-engaging device to be engaged at the time of gear shifting.

FIG. 8 is a time chart showing an example of an action of the linear solenoid valve SL at the time of gear shifting of the stepped transmission section 20, and illustrating how the driving current IDR to the linear solenoid valve SL changes during a transitional period of engagement of a predetermined hydraulic friction-engaging device CB to be engaged at the time of gear shifting. Since the output pressure PSL of the linear solenoid valve SL is determined when the driving current IDR is specified as shown in FIG. 7, the driving current IDR can serve as an oil pressure command value for the output pressure PSL.

In the period from time t1 to time t2 (quick charge period), the driving current IDR is temporarily increased for pack closing of closing a pack clearance. In the period from time t2 to time t3 (a period of constant standby pressure), the driving current IDR is maintained at a level corresponding to a constant standby pressure that is a state shortly before engagement. In the period from time t3 to time t4 (sweep period), the driving current IDR is gradually raised to gradually increase the engagement torque. At time t4 when it is determined that synchronization has been achieved, the driving current IDR is increased to a maximum value. The relationship between the driving current IDR and time t [ms] during the transitional period of engagement as shown in the time chart of FIG. 8 is a parameter used in a control program for gear shifting control.

The linear solenoid valves SL vary in valve characteristics, and the hydraulic friction-engaging devices CB vary in engagement characteristics. To reduce these variations in characteristics among the linear solenoid valves SL and the hydraulic friction-engaging devices CB, learning of correcting the driving current IDR to the linear solenoid valve SL is performed. For example, the driving current value IDRx [A] shown in FIG. 8 corresponding to the constant standby pressure of the hydraulic friction-engaging device CB to be engaged is used as a parameter that is the object of learning. The driving current value IDRx corresponding to the constant standby pressure of the hydraulic friction-engaging device CB to be engaged corresponds to the "oil pressure command value" in the present disclosure.

This learning consists of in-factory learning that is executed in the factory, with the engine 12 operating, before shipment of the vehicle 10 or delivery of the vehicle 10 of which the compound transmission 40 has been replaced or repaired, and on-road learning that is executed after the vehicle 10 is shipped from the factory or the vehicle 10 of which the compound transmission 40 has been replaced or repaired is delivered, while the vehicle 10 is traveling.

In-factory learning is learning that involves outputting a standard value STN [A] as the driving current value IDRx to the linear solenoid valve SL and measuring the resulting shift shock, and then correcting the standard value STN so as to reduce the shift shock. This shift shock is attributable to tie-up of the stepped transmission section 20, a flare (racing) of the engine speed Ne, etc. For example, a flare amount (racing amount) Neblow [rpm] (see FIG. 9) that is an amount of flare of the engine speed Ne is detected as an amount of temporary rise in the engine speed Ne during a transitional period of gear shifting. By this in-factory learning, the driving current value IDRx is corrected from the standard value STN to a value obtained by adding an in-factory correction value to the standard value STN. The value obtained by adding the in-factory correction value to the standard value STN is stored in the learning data storage unit 100d as a pre-learning set value SET [A] that is a value before on-road learning.

When gear shifting is executed while the vehicle 10 is traveling, on-road learning is executed, based on the actual control result, about the driving current value IDRx for which the pre-learning set value SET is output to one of the linear solenoid valves SL1 to SL4 that is involved in gear shifting, i.e., that corresponds to the friction-engaging element to be released or engaged to shift gears. Specifically, for example, whether or not a flare has occurred during gear shifting that has been executed is detected, and the driving current value IDRx for the linear solenoid valves SL is corrected so as to bring the detected flare amount closer to a predetermined target value. The flare amount and the predetermined target value will be described later.

In on-road learning, the amount of correction is calculated in each learning session, and learning of correcting the driving current value IDRx by the calculated correction amount is repeated each time gear shifting is executed while the vehicle 10 is traveling. By using a correction value CMP [A] that is a total value of the amounts of correction of the respective learning sessions in the case of repeated learning by on-road learning, the driving current value IDRx is corrected from the pre-learning set value SET to the learned value LRN [A] that is obtained by adding the correction value CMP to the pre-learning set value SET. The correction value CMP learned by on-road learning is stored in the learning data storage unit 100d. At the beginning of on-road learning, the correction value CMP is a zero value. On-road learning corresponds to "learning" in the present disclosure, and the correction value CMP corresponds to the "learning data" in the present disclosure. The learning data is stored as data showing the result of on-road learning.

Figure 9:
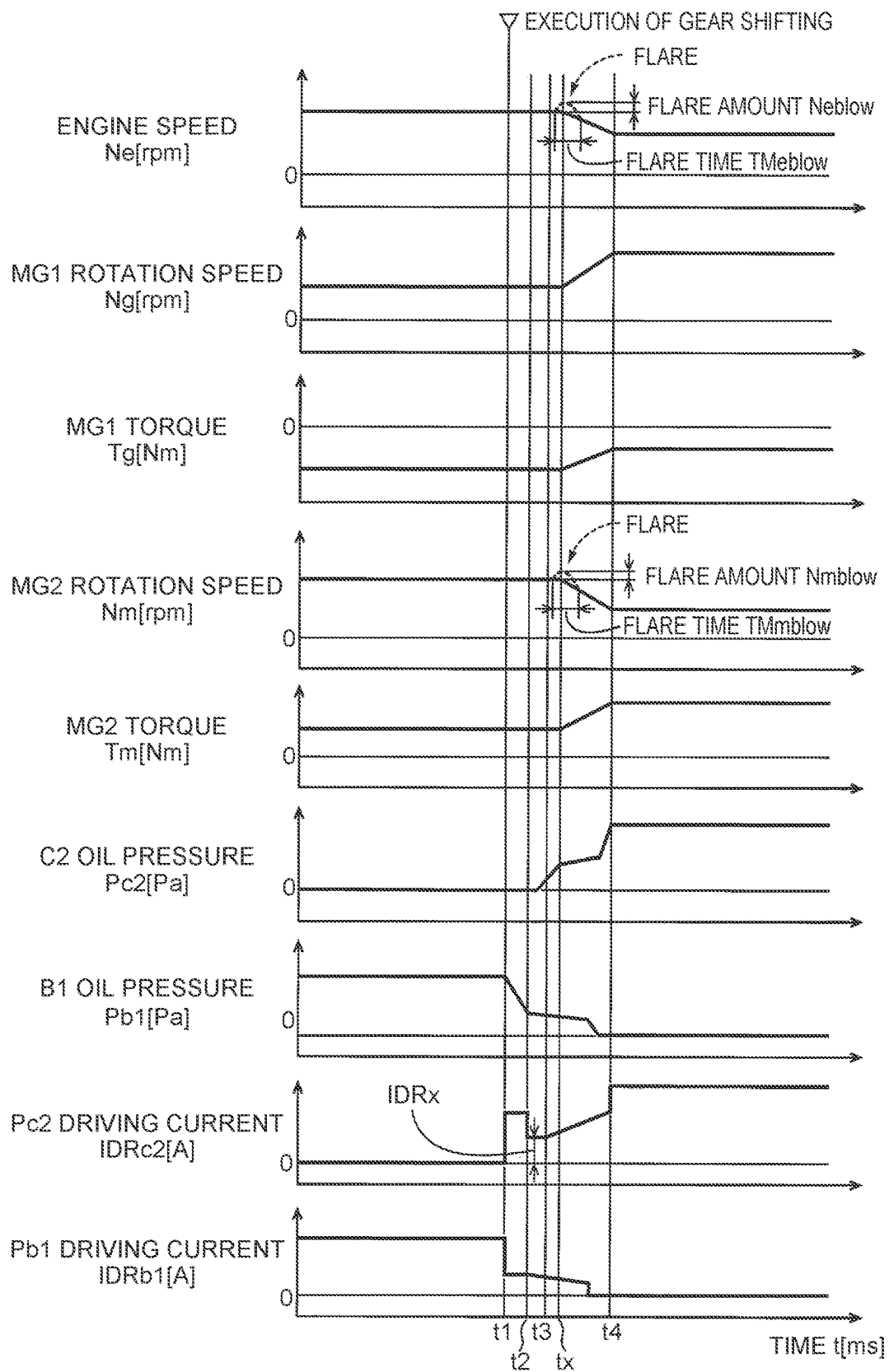
FIG. 9 is an example of a time chart of on-road learning in the case of gear shifting of the stepped transmission section from a second-speed gear stage to a third-speed gear stage.

FIG. 9 is one example of a time chart of on-road learning in the case of gear shifting of the stepped transmission section 20 from the second-speed gear stage to the third-speed gear stage. In FIG. 9, a state where no flare has occurred is indicated by a solid line, and a state where a flare has occurred is indicated by a dashed line. In FIG. 9, the axis of abscissas shows time t [ms] and the axis of ordinates shows, from the top, the engine speed Ne, the MG1 rotation speed Ng, the MG1 torque Tg, the MG2 rotation speed Nm, the MG2 torque Tm, a C2 oil pressure Pc2 [Pa] that is an oil pressure supplied to the hydraulic actuator 62b that controls the application state of the clutch C2, a B1 oil pressure Pb1 [Pa] that is an oil pressure supplied to the hydraulic actuator 62c that controls the application state of the brake B1, a Pc2 driving current IDRc2 [A] that is an oil pressure command value for the C2 oil pressure Pc2, and a Pb1 driving current IDRb1 [A] that is an oil pressure command value for the B1 oil pressure Pb1. The object of learning is the driving current value IDRx corresponding to the constant standby pressure at the Pc2 driving current IDRc2 of the C2 oil pressure Pc2 supplied to the hydraulic actuator 62b that controls the application state of the clutch C2 that is the hydraulic friction-engaging device to be engaged.

At time t1, execution of clutch-to-clutch shifting is started. In the period from time t1 to time t4, the Pc2 driving current IDRc2 to the hydraulic actuator 62b that controls the application state of the clutch C2 being the hydraulic friction-engaging device to be engaged is changed from a low state to a high state in accordance with the above-described time chart shown in FIG. 8. Meanwhile, during the period from time t1 to time t4, the Pb1 driving current IDRb1 to the hydraulic actuator 62c that controls the application state of the brake B1 being the hydraulic friction-engaging device to be released is gradually changed from a high state to a low state. On-road learning is executed such that at time tx (t1<tx<t4) during this clutch-to-clutch shifting (i.e., during control of switching of the gear stage of the stepped transmission section 20), the flare amount Neblow that is the amount of flare of the engine speed Ne is within a predetermined target range including predetermined target values Blowtgt [rpm]. The predetermined target range for the flare amount Neblow is a range that is set in advance through experiment or design so as to realize execution of such clutch-to-clutch shifting that shift shock and shift time are within allowable ranges.

Specifically, when the flare amount Neblow is larger than a target upper limit value Blowtgt2 [rpm] of the predetermined target range, it is inferred that there is a period in which neither of the brake B1 and the clutch C2 has a transmission torque due to a time lag between a releasing action of the brake B1 and an engaging action of the clutch C2. In this case, shift shock or prolongation of shift time may occur. In the next gear shifting, therefore, the driving current value IDRx is increased by the correction amount of one learning session from the value before the current session of learning by on-road learning such that the time lag between the releasing action of the brake B1 and the engaging action of the clutch C2 is eliminated or reduced. Thus, in the next gear shifting, the driving current value IDRx is increased from the current driving current value IDRx by the correction amount of one learning session.

Conversely, when the flare amount Neblow is smaller than a target lower limit value Blowtgt1 [rpm] of the predetermined target range, tie-up of both the brake B1 and the clutch C2 having a transmission torque occurs as the releasing action of the brake B1 and the engaging action of the clutch C2 coincide with each other, which may result in shift shock. In the next gear shifting, therefore, the driving current value IDRx is reduced by the correction amount of one learning session from the value before the current session of learning by on-road learning such that the tie-up is eliminated or mitigated. Thus, in the next gear shifting, the driving current value IDRx is reduced from the current driving current value IDRx by the correction amount of one learning session.

When the flare amount Neblow is within the predetermined target range, this means that execution of such clutch-to-clutch shifting that shift shock and shift time are within the allowable ranges is already realized, and therefore the driving current value IDRx is not corrected, i.e., not changed. Thus, the driving current value IDRx for the next gear shifting is set to the same value as that of the current gear shifting.

On-road learning is executed in the entire travel range, i.e., the entire range of the throttle valve opening degree θth (or the accelerator operation amount θacc), and is executed, for example, with the throttle valve opening degree θth (or the accelerator operation amount θacc) being divided into predetermined ranges. For each predetermined range, the correction value CMP that is a total value of the amounts of correction obtained by repeated learning is learned.

FIG. 10 is an example of the correction value CMP for the Pc2 driving current value IDRc2 that has been learned with the throttle valve opening degree θth divided into predetermined ranges in the case of gear shifting of the stepped transmission section 20 from the second-speed gear stage to the third-speed gear stage. As shown in FIG. 10, for example, the throttle valve opening degree θth is divided into four predetermined ranges: a range of 0 [%] or larger but smaller than 25 [%]; a range of 25 [%] or larger but smaller than 50 [%]; a range of 50 [%] or larger but smaller than 75 [%]; and a range of 75 [%] or larger but smaller than 100 [%]. For the driving current value IDRx corresponding to each of these four divided predetermined ranges, the correction value CMP is learned as a value ΔPc2-1, a value ΔPc2-2, a value ΔPc2-3, or a value ΔPc2-4 by on-road learning. The driving current value IDRx that is the parameter used in the control program is corrected by each of the correction values CMP (the value ΔPc2-1, the value ΔPc2-2, the value ΔPc2-3, and the value ΔPc2-4) learned by on-road learning for the respective predetermined ranges. Not only when gears are shifted from the second-speed gear stage to the third-speed gear stage in the stepped transmission section 20 but also when gears are shifted between a different pair of gear stages, the driving current value IDRx corresponding to the constant standby pressure of the hydraulic friction-engaging device CB to be engaged serves as a parameter that is the object of learning for each predetermined range of the throttle valve opening degree θth. Thus, there is a plurality of parameters that serves as objects of learning, and the correction value CMP is learned for each of these parameters.

Like the driving device ECU 100, each of the first gateway ECU 150 and the second gateway ECU 152 shown in FIG. 1 includes a so-called microcomputer having, for example, a CPU, RAM, ROM, input-output interface, and others. Maintenance information to be described later is sent to the driving device ECU 100 by either the first gateway ECU 150 or the second gateway ECU 152. The first gateway ECU 150 can communicate wirelessly with a server 160 and executes control of receiving maintenance information from the server 160 and sending the maintenance information to the driving device ECU 100. The second gateway ECU 152 can connect to the server 160 through a connector 170 and executes control of receiving maintenance information from the server 160 and sending the maintenance information to the driving device ECU 100. The server 160 is, for example, a computer including a program for providing maintenance information to the vehicle 10, a CPU that executes the program, and a maintenance storage unit 160a that is a storage device for storing maintenance information.

As the first rotating machine MG1 and the second rotating machine MG2, for example, synchronous motors (that function also as power generators as described above) are used because of good controllability of their rotation speed when acting as travel driving force sources. These synchronous motors are, for example, magnet-embedded synchronous motors having a structure in which permanent magnets are disposed (embedded) inside a rotor. The rotor, magnetized by the permanent magnets, is attracted to and repelled from a rotating magnetic field generated by a stator and thereby rotated. In a synchronous motor, the rotor is driven to rotate as a rotating magnetic field according to the rotation position (angular position) of the rotor is generated. Therefore, if the rotation position of the rotor in a synchronous motor is not correctly detected, the synchronous motor will not be correctly driven. The first rotating machine MG1 and the second rotating machine MG2 are provided with the resolvers 74, 76, respectively, to correctly detect the rotation positions of the rotors.

The resolver 74 generally includes a resolver rotor that rotates in conjunction with the rotor of the first rotating machine MG1, i.e., rotates integrally with the rotor while being unable to rotate relatively thereto, and is configured to detect the rotation position of the rotor of the first rotating machine MG1 by detecting the rotation position (angular position) of the resolver rotor. However, due to an error in the mounting position of the resolver 74 etc., an amount of difference (offset amount θoff [rad]) may occur between the rotation position of the rotor of the first rotating machine MG1 detected by the resolver 74 and the actual rotation position of the rotor of the first rotating machine MG1. Hereinafter, a case where the offset amount θoff is not zero will be referred to as "there is an offset" and a case where the offset amount θoff is zero will be referred to as "there is no offset."

If an "offset adjustment" to be described later is not performed in the state where there is an offset, it will be difficult to correctly drive the first rotating machine MG1. Therefore, it is necessary to perform the offset adjustment of the resolver 74 when mounting the first rotating machine MG1 and the resolver 74 after installing the compound transmission 40 in the vehicle 10 (e.g., replacing or repairing the compound transmission 40). The "offset adjustment" is an adjustment that involves detecting the offset amount θoff of the resolver 74 provided in the first rotating machine MG1, and correcting the rotation position of the rotor of the first rotating machine MG1 detected by the resolver 74 according to the detected offset amount θoff so as to correctly represent the actual rotation position of the rotor of the first rotating machine MG1. Also for the resolver 76 provided in the second rotating machine MG2, as with the resolver 74, it is necessary to perform the offset adjustment of the resolver 76 when mounting the second rotating machine MG2 and the resolver 76 after installing the compound transmission 40. Thus, the offset adjustment of the resolvers 74, 76 is performed upon replacement of the compound transmission 40. The offset adjustment performed on the resolvers 74, 76 corresponds to the "adjustment" in the present disclosure. The "adjustment" in the present disclosure refers to an adjustment that is performed upon replacement of a "part" of the vehicle 10, such as the compound transmission 40, such that that part or constituent members relating to that part work appropriately.

In the following, the offset adjustment of the resolver 74 will be described. The offset adjustment of the resolver 76 is the same and therefore will not be described here.

FIG. 11A and FIG. 11B are graphs of a relationship between an exciting voltage Vd [V] and a torque voltage Vq [V] that are detected while the first rotating machine MG1 is rotating with zero output torque, illustrating a difference between when the resolver 74 has an offset and when it does not have an offset. FIG. 11A is a graph in a case where the resolver does not have an offset. FIG. 11B is a graph in a case where the resolver has an offset. The axis of abscissas and the axis of ordinates shown in FIG. 11A and FIG. 11B are a d-axis (exciting voltage Vd) and a q-axis (torque voltage Vq) in so-called vector control.

Detection of the offset amount θoff of the resolver 74 is performed, for example, while the first rotating machine MG1 is rotating with zero output torque. When the resolver 74 does not have an offset in this state, both an exciting current Id [A] that is a current for generating a rotating magnetic field and a torque current Iq [A] that is a current for generating an output torque become zero in a dq-axis coordinate system. Therefore, when the first rotating machine MG1 is rotating with zero output torque, exciting voltage Vd=0 and torque voltage Vq=ωφ as shown in the following Formulae (3) and (4) are derived from the voltage equations shown in the following Formulae (1) and (2). The symbols ω [rad/s], φ [Wb], R [Ω], Ld [H], and Lq [H] denote the angular speed of the rotor, a predetermined magnetic flux according to a stator interlinkage magnetic flux of the permanent magnets embedded in the rotor, the resistance of the windings wound around the stator, a d-axis inductance, and a q-axis inductance, respectively.

$$Vd = -\omega \cdot Lq \cdot Iq + R \cdot Id \qquad (1)$$

$$Vq = \omega \cdot Ld \cdot Id + \omega \phi + R \cdot Iq \qquad (2)$$

$$Vd = 0 \qquad (3)$$

$$Vq = \omega \phi \qquad (4)$$

The states expressed by Formulae (3) and (4) can be represented in a dq-axis coordinate system as in FIG. 11A. However, if the resolver 74 has an offset, recognition axes for control are shifted as indicated by dashed lines in FIG. 11B, so that the exciting voltage Vd (a d-axis component Vd') which is supposed to be zero is detected. The offset amount θoff of the resolver 74 is detected based on the exciting voltage Vd thus detected. The detected offset amount θoff of the resolver 74 is stored in the offset storage unit 100e along with update information indicating that the offset amount θoff has been updated, such as the date of detection or a revision number (version). After the offset amount θoff of the resolver 74 is detected, the rotation position of the rotor of the first rotating machine MG1 detected by the resolver 74 is corrected by the offset amount θoff stored in the offset storage unit 100e, so that the actual rotation position of the rotor of the first rotating machine MG1 is correctly recognized and the first rotating machine MG1 is correctly driven. Thus, the offset adjustment is performed that involves detecting the offset amount θoff of the resolver 74, and correcting the rotation position of the rotor of the first rotating machine MG1 detected by the resolver 74 according to the detected offset amount θoff so as to correctly represent the actual rotation position of the rotor of the first rotating machine MG1.

FIG. 12 is an example of maintenance information that has been updated after replacement the compound transmission 40 of the vehicle 10. The maintenance information on the vehicle 10 is stored as electronic data in the maintenance storage unit 160a that is a storage device inside the server 160.

As shown in FIG. 12, in the maintenance information, information relating to maintenance of the vehicle 10 is recorded as the vehicle's history along with general items about the vehicle 10, such as the name of the vehicle, the vehicle body number, the name of the dealer, and the name of inspection. In the vehicle's history, information relating to purchase of the vehicle 10 and replacement of the compound transmission 40 since the purchase of the vehicle 10 (replacement record) is recorded with the date of purchase and the date of replacement, respectively.

In the following, a case where maintenance information is sent from the first gateway ECU 150 to the driving device ECU 100 will be described as an example.

As shown in FIG. 1, the driving device ECU 100 functionally includes an IG determining unit 100f, a sending-receiving unit 100g, a replacement determining unit 100h, and a rewriting executing unit 100i. The first gateway ECU 150 functionally includes a wireless communication unit 150a and a sending-receiving unit 150b. The driving device ECU 100 corresponds to the "control device" in the present disclosure.

The IG determining unit 100f determines whether or not the ignition signal IG has been switched from an OFF signal to an ON signal. When the ignition switch 94 is turned off, the ignition signal IG becomes the OFF signal that stops the travel driving force sources, so that the engine 12, the first rotating machine MG1, and the second rotating machine MG2 that are travel driving force sources are stopped. When the ignition switch 94 is turned on, the ignition signal IG becomes the ON signal that starts the travel driving force sources, so that the engine 12, the first rotating machine MG1, and the second rotating machine MG2 that are travel driving force sources are put in a state of being able to output a travel driving force.

The replacement determining unit 100h determines whether or not the offset adjustment has been performed on at least either of the resolvers 74, 76 provided in the compound transmission 40 controlled by the parameter that is the object of learning. The offset adjustment is determined to have been performed, for example, when either of the following conditions is met: (a) the value of the offset amount θoff of at least either of the resolvers 74, 76 has been changed based on the offset adjustment; and (b) the date of detection or the revision number in the aforementioned update information has been updated based on the offset adjustment of at least either of the resolvers 74, 76. Thus, the offset adjustment is determined to have been performed when at least one offset amount θoff has been changed based on the offset adjustment of the resolvers 74, 76.

When the IG determining unit 100f determines that the ignition signal IG has been switched from the OFF signal to the ON signal, the sending-receiving unit 100g sends to the sending-receiving unit 150b a switching signal indicating that the ignition signal IG has been switched from the OFF signal to the ON signal.

When the switching signal is received by the sending-receiving unit 150b, the wireless communication unit 150a acquires the maintenance information on the vehicle 10 from the maintenance storage unit 160a of the server 160. The sending-receiving unit 150b sends to the sending-receiving unit 100g the maintenance information acquired by the wireless communication unit 150a.

When the maintenance information is received by the sending-receiving unit 100g, the replacement determining unit 100h determines whether or not the replacement record of the compound transmission 40 included in the maintenance information has been updated. For example, when the date of replacement in the replacement record of the compound transmission 40 recorded in the vehicle's history included in the maintenance information is updated (including a case where a new date of replacement is added to the replacement record), after the update, it is determined only once that the replacement record has been updated. The replacement determining unit 100h determines that the replacement record has been updated, preferably only once when determining for the first time whether or not the replacement record has been updated after the update of the replacement record.

When either of the conditions that the offset adjustment is determined to have been performed on at least either of the resolvers 74, 76 and that the replacement record of the compound transmission 40 is determined to have been updated is met, the replacement determining unit 100h determines that the compound transmission 40 that is integrally configured with the first rotating machine MG1 and the second rotating machine MG2 provided with the resolvers 74, 76 has been replaced. When the offset adjustment is determined not to have been performed on either of the resolvers 74, 76 and the replacement record of the compound transmission 40 is determined not to have been updated, the replacement determining unit 100h determines that the compound transmission 40 has not been replaced.

When the replacement determining unit 100h determines that the compound transmission 40 has been replaced, the rewriting executing unit 100i resets the correction value CMP stored in the learning data storage unit 100d. When the replacement determining unit 100h determines that the compound transmission 40 has not been replaced, the rewriting executing unit 100i does not reset the correction value CMP stored in the learning data storage unit 100d. The meaning of resetting the correction value CMP includes returning the correction value CMP to the zero value that is the value at the beginning of on-road learning, as well as setting the correction value CMP to a predetermined value that is determined in advance so as to bring the correction value CMP closer to the zero value that is the value at the beginning of on-road learning. For example, this predetermined value is a value obtained by multiplying the correction value CMP shortly before being reset by a correction factor k ($0 < k < 1$).

Figure 13:
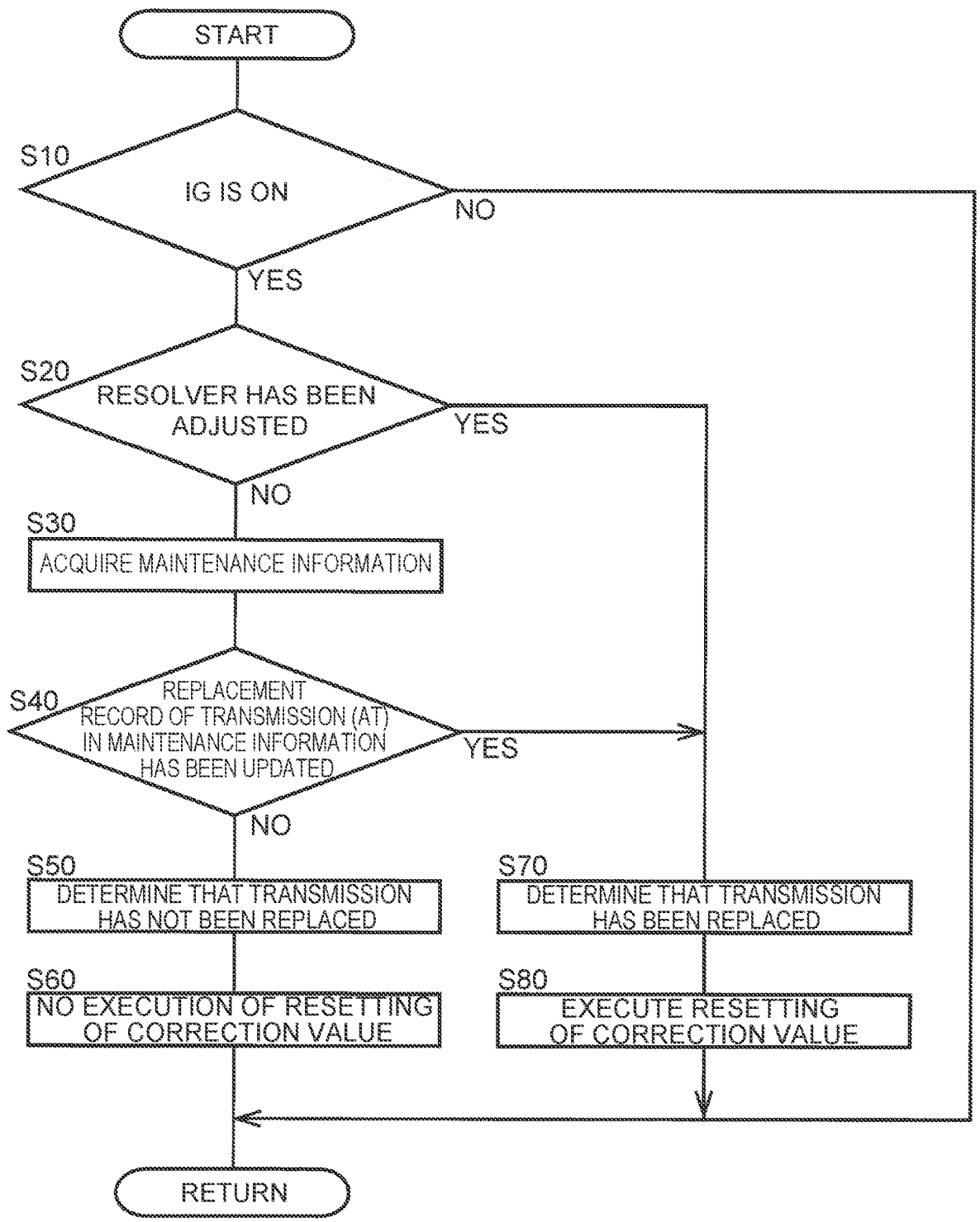
FIG. 13 is an example of a flowchart illustrating a main part of control operation of the driving device ECU shown in FIG. 1.

FIG. 13 is one example of a flowchart illustrating a main part of control operation of the driving device ECU 100 shown in FIG. 1. The flowchart of FIG. 13 is repeatedly executed.

In step S10 corresponding to the function of the IG determining unit 100*f*, it is determined whether or not the ignition signal IG has been switched from the OFF signal to the ON signal. When the determination result in step S10 is affirmative, step S20 is executed. When the determination result in step S10 is negative, the process returns to the start.

In step S20 corresponding to the function of the replacement determining unit 100*h*, it is determined whether or not the offset adjustment has been performed on at least either of the resolvers 74, 76. The offset adjustment is determined to have been performed, for example, when one of the value of the offset amount θoff, the date of detection, and the revision number of at least either of the resolvers 74, 76 stored in the offset storage unit 100*e* is different between the last execution of the flowchart and the current execution of the flowchart. When the determination result in step S20 is affirmative, step S70 is executed. When the determination result in step S20 is negative, step S30 is executed.

In step S30 corresponding to the function of the sending-receiving unit 100*g*, the maintenance information on the vehicle 10 is acquired. Then, step S40 is executed.

In step S40 corresponding to the function of the replacement determining unit 100*h*, it is determined whether or not the replacement record of the compound transmission 40 included in the maintenance information has been updated. The replacement record is determined to have been updated, for example, when the latest date of replacement in the replacement record of the compound transmission 40 that is recorded in the vehicle's history included in the maintenance information stored in the maintenance storage unit 160*a* is different between the last execution of the flowchart and the current execution of the flowchart. Thus, after the replacement record included in the maintenance information is updated, it is determined only once that the replacement record has been updated. When the determination result in step S40 is affirmative, step S70 is executed. When the determination result in step S40 is negative, step S50 is executed.

In step S50 corresponding to the function of the replacement determining unit 100*h*, it is determined that the compound transmission 40 has not been replaced. Then, step S60 is executed.

In step S60 corresponding to the function of the rewriting executing unit 100*i*, the correction value CMP is not reset. Then, the process returns to the start.

In step S70 corresponding to the function of the replacement determining unit 100*h*, it is determined that the compound transmission 40 has been replaced. As described above, in step S40, after the replacement record included in the maintenance information is updated, it is determined only once that the replacement record has been updated. Therefore, after the replacement record is updated, it is determined only once that the compound transmission 40 has been replaced. Then, step S80 is executed.

In step S80 corresponding to the function of the rewriting executing unit 100*i*, the correction value CMP is reset. Then, the process returns to the start.

In this embodiment, the driving device ECU 100 includes (a) the learning data storage unit 100*d* that stores the correction value CMP learned by on-road learning, (b) the replacement determining unit 100*h* that determines whether or not the compound transmission 40 controlled by the parameter has been replaced, and (c) the rewriting executing unit 100*i* that resets the correction value CMP stored in the learning data storage unit 100*d* when the replacement determining unit 100*h* determines that the compound transmission 40 has been replaced. The replacement determining unit 100*h* determines that the compound transmission 40 has been replaced based on the offset adjustment that is performed upon replacement of the compound transmission 40. Thus, the determination as to replacement of the compound transmission 40 is automatically made based on the offset adjustment that is performed upon replacement of the compound transmission 40. Since the determination as to replacement of the compound transmission 40 is automatically made and the correction value CMP is reset, on-road learning is appropriately executed upon replacement of the compound transmission 40, so that degradation of the controllability of the vehicle 10 after replacement of the compound transmission 40 is quickly mitigated.

In this embodiment, the adjustment performed upon replacement of the compound transmission 40 is the offset adjustment of the resolvers 74, 76 provided in the first rotating machine MG1 and the second rotating machine MG2, respectively, that transmit a travel driving force to the compound transmission 40. It is possible to infer that the first rotating machine MG1 and the second rotating machine MG2 have been re-mounted and, by extension, to automatically determine that the compound transmission 40 has been replaced, based on the offset adjustment of the resolvers 74, 76.

In this embodiment, the replacement determining unit 100*h* determines that the compound transmission 40 has been replaced based on an update, resulting from the offset adjustment, in the replacement record of the compound transmission 40 included in the maintenance information. Since the determination as to replacement of the compound transmission 40 is automatically made based on an update in the replacement record and the correction value CMP is reset, degradation of the controllability of the vehicle 10 after replacement of the compound transmission 40 is quickly mitigated.

In this embodiment, after the replacement record of the compound transmission 40 included in the maintenance information is updated, the replacement determining unit 100*h* determines only once that the compound transmission 40 has been replaced. Since the compound transmission 40 is determined to have been replaced only once after the replacement record is updated, the correction value CMP is reset only once upon replacement of the compound transmission 40 and thus execution of unnecessary on-road learning is avoided.

In this embodiment, (a) the part for which determination as to replacement is made is the compound transmission 40 that is a transmission, and (b) the parameter that is the object of learning is the driving current value IDRx for controlling switching of the gear stage of the compound transmission 40. Thus, when it is determined that the compound transmission 40 has been replaced, the correction value CMP relating to the driving current value IDRx stored in the learning data storage unit 100*d* is reset. Therefore, on-road learning is appropriately executed upon replacement of the compound transmission 40, so that aggravation of shift shock that occurs when the gear stage is switched after replacement of the compound transmission 40 is quickly mitigated.

In this embodiment, the driving device ECU 100 further includes the IG determining unit 100*f* that determines whether or not the ignition signal IG has been switched from the OFF signal that stops the engine 12, the first rotating machine MG1, and the second rotating machine MG2 that are travel driving force sources to the ON signal that starts these travel driving force sources. The replacement determining unit 100*h* determines whether or not the compound transmission 40 has been replaced when the IG determining unit 100*f* determines that the ignition signal IG has been switched from the OFF signal to the ON signal. Since the correction value CMP is reset when the ignition signal IG is switched from the OFF signal to the ON signal, a sense of discomfort that the driver feels can be reduced compared with when the correction value CMP is reset while the vehicle is traveling.

While the embodiment of the present disclosure has been described in detail above based on the drawings, the disclosure can also be implemented with other aspects.

In the above-described embodiment, the offset storage unit 100*e* that stores the detected offset amounts θoff of the respective resolvers 74, 76 and the update information indicating that these offset amounts θoff have been updated is provided in the driving device ECU 100, but the present disclosure is not limited to this aspect. For example, the detected offset amounts θoff of the respective resolvers 74, 76 may be stored in the offset storage unit 100*e* inside the driving device ECU 100, while the update information indicating that these offset amounts θoff have been updated may be stored in the server 160. In the case of this configuration, the update information on the detected offset amounts θoff of the respective resolvers 74, 76 is acquired from the server 160 before execution of step S20 of the flowchart shown in FIG. 13.

In the above-described embodiment, the maintenance storage unit 160*a* that stores maintenance information is provided in the server 160, but the present disclosure is not limited to this aspect. For example, a maintenance storage unit that stores maintenance information may be provided in the driving device ECU 100. In the case of this configuration, in step S30 of the flowchart shown in FIG. 13, the maintenance information may be acquired from the maintenance storage unit provided in the driving device ECU 100.

In the above-described embodiment, the parameter that is the object of learning is the driving current value IDRx corresponding to the constant standby pressure of the hydraulic friction-engaging device to be engaged during clutch-to-clutch shifting, but the present disclosure is not limited to this aspect. For example, the parameter may be the driving current value of the driving current IDR for pack closing in the period from time t1 to time t2 shown in the time chart of FIG. 8, or may be the length of the period from time t1 to time t2 (quick charge period) or the length of the period from time t2 to time t3 (the period of constant standby pressure). Further, the parameter that is the object of learning is not limited to one relating to the hydraulic friction-engaging device to be engaged of the stepped transmission section 20 included in the compound transmission 40; the parameter may also be, for example, a fuel injection amount, fuel injection timing, or ignition timing in the engine control device 50 that controls the engine 12. Thus, the term "parameter" refers to a control value for directly or indirectly controlling a part (e.g., the compound transmission 40 or the engine 12), and the operation of the part controlled is changed as this control value is corrected by on-road learning.

In the above-described embodiment, the learning unit 100*c* executes on-road learning based on the flare amount Neblow that is an amount of flare of the engine speed Ne, but the present disclosure is not limited to this aspect. For example, the learning unit 100*c* may execute on-road learning such that, instead of the flare amount Neblow, at least one of a flare amount Nmblow [rpm] that is an amount of flare of the MG2 rotation speed Nm, a flare time (racing time) TMeblow [ms] that is a time of flare of the engine speed Ne, and a flare time TMmblow [ms] that is a time of flare of the MG2 rotation speed Nm, shown in FIG. 9, is within a predetermined target range thereof. The flare amount Nmblow is detected as an amount of temporary rise in the MG2 rotation speed Nm during a transitional period of gear shifting. The flare time TMeblow and the flare time TMmblow are detected as a time of temporary rise in the engine speed Ne and the MG2 rotation speed Nm, respectively, during a transitional period of gear shifting. The predetermined target range of each of the flare time TMeblow, the flare amount Nmblow, and the flare time TMmblow is a range that is set in advance through experiment or design so as to realize execution of such clutch-to-clutch shifting that shift shock and shift time remain within allowable ranges.

In the above-described embodiment, a learning guard value GD [A] for preventing erroneous learning in on-road learning is not provided, but it may be provided. Specifically, when the absolute value of the correction value CMP that is a total value of the amounts of correction of the respective learning sessions in the case of repeated learning by on-road learning exceeds a range specified by the learning guard value GD (>0) (i.e., when CMP<−GD or GD<CMP), the driving current value IDRx that is the object of learning is corrected by only a minimum value (−GD) or a maximum value (GD) in the specified range, i.e., by only the learning guard value GD. On the other hand, when the absolute value of the correction value CMP is within the range specified by the learning guard value GD (i.e., −GD≤CMP≤GD), correction of the driving current value IDRx by the correction value CMP is executed by on-road learning. The learning guard value GD specifies the upper limit value of the absolute value of the correction value CMP that is the sum of the amounts of correction resulting from repeated correction by on-road learning.

In the above-described embodiment, the "learning data" stored in the learning data storage unit 100*d* is the correction value CMP, but the present disclosure is not limited to this aspect. Instead of the correction value CMP, for example, the learned value LRN may be stored as the "learning data." Since the learned value LRN is a value obtained by adding the correction value CMP to the pre-learning set value SET, storing the pre-learning set value SET and the learned value LRN in the learning data storage unit 100*d* is equivalent to storing the result of on-road learning. In the case of this aspect, the rewriting executing unit 100*i* resets the learned value LRN instead of resetting the correction value CMP. The meaning of resetting the learned value LRN includes returning the learned value LRN to the pre-learning set value SET that is the value at the beginning of on-road learning, as well as setting the learned value LRN to a predetermined value that is determined in advance so as to bring the leaned value LRN closer to the pre-learning set value SET that is the value at the beginning of on-road learning. For example, this predetermined value is a value obtained by adding, to the pre-learning set value SET, a value obtained by multiplying the difference between the learned value LRN shortly before being reset and the pre-learning set value SET by the correction factor k (0<k<1).

In the above-described embodiment, the part that is controlled by the parameter is the compound transmission 40, but the present disclosure is not limited to this aspect. If there is a part, other than the compound transmission 40, upon replacement of which an adjustment is performed, a determination as to replacement of that part may be made based on the adjustment, or a determination as to replacement of that part may be made based on a replacement record of that part included in maintenance information.

In the above-described embodiment, the driving device ECU 100 includes the learning data storage unit 100d, the IG determining unit 100f, the replacement determining unit 100h, and the rewriting executing unit 100i, but the present disclosure is not limited to this aspect. The driving device ECU 100 and other control functions may, as necessary, be integrated into one electronic control device, or the driving device ECU 100 may, as necessary, be functionally divided into a different electronic control device and an external memory.

In the above-described embodiment, the maintenance information on the vehicle 10 is sent from the server 160 to the first gateway ECU 150 by wireless communication, and the sent maintenance information is sent from the first gateway ECU 150 to the driving device ECU 100, but the present disclosure is not limited to this aspect. For example, the maintenance information on the vehicle 10 may be sent from the server 160 to the second gateway ECU 152, and the sent maintenance information may be sent from the second gateway ECU 152 to the driving device ECU 100. The second gateway ECU 152 has substantially the same control function as the first gateway ECU 150, but is different from the first gateway ECU 150 in that the maintenance information is sent to the second gateway ECU 152 through the connector 170 from the server 160 that is connected thereto by wire, and not wirelessly. Thus, the second gateway ECU 152 functionally includes a communication unit that can receive data from the server 160 instead of the wireless communication unit 150a, and the sending-receiving unit 150b.

In the above-described embodiment, the vehicle 10 is a hybrid vehicle, but the present disclosure is not limited to this aspect. For example, the vehicle 10 may also be a vehicle that does not have the engine 12 and has only rotating machines, such as the first rotating machine MG1 and the second rotating machine MG2, as travel driving force sources. Alternatively, the vehicle 10 may have only one rotating machine that transmits a travel driving force to the transmission. In the case of this configuration, whether or not the offset adjustment has been performed is determined based on a resolver provided in that one rotating machine.

What has been described above is merely an embodiment of the present disclosure. The disclosure can be implemented with various changes and improvements based on the knowledge of those skilled in the art made to the aspects thereof within the scope of the gist of the disclosure.

What is claimed is:

1. A vehicle control device that performs learning to correct a parameter used in a control program for controlling a vehicle, the vehicle control device comprising:
   a memory that stores learning data obtained by the learning; and
   a microcomputer programmed to:
      automatically determine whether or not a part controlled by the parameter has been replaced; and
      reset the learning data stored in the memory when the microcomputer determines that the part has been replaced, wherein
   in automatically determining whether or not the part controlled by the parameter has been replaced, the microcomputer is further programmed to:
      detect that an update is made to an offset amount of a sensor from an adjustment of the sensor, the adjustment of the sensor being performed after the sensor is re-mounted on the vehicle upon replacement of the part, the adjustment being an offset adjustment that automatically corrects a value detected by the sensor according to the offset amount; and
      based on the detection of the update to the offset amount of the sensor, automatically determine that the part controlled by the parameter has been replaced, wherein the sensor is a resolver, and the offset amount of the sensor is an amount of difference between a rotation position of a rotor detected by the resolver and an actual rotation position of the rotor.

2. The vehicle control device according to claim 1, wherein the sensor is a resolver provided in a rotating machine that transmits a travel driving force to the part, and the rotating machine is re-mounted on the vehicle after the part is replaced.

3. The vehicle control device according to claim 1, wherein the microcomputer determines that the part has been replaced based on an update, resulting from the adjustment, in a replacement record of the part included in maintenance information.

4. The vehicle control device according to claim 3, wherein, after the replacement record is updated, the microcomputer determines only once that the part has been replaced.

5. The vehicle control device according to claim 1, wherein:
   the part is a transmission; and
   the parameter is an oil pressure command value for controlling switching of a gear stage of the transmission.

6. The vehicle control device according to claim 1, wherein the microcomputer is further programmed to
   determine whether or not an ignition signal has been switched from an OFF signal that stops a travel driving force source to an ON signal that starts the travel driving force source, wherein the microcomputer determines whether or not the part has been replaced upon determining that the ignition signal has been switched from the OFF signal to the ON signal.

* * * * *